T. RHODUS.
VEHICLE WHEEL.
APPLICATION FILED FEB. 15, 1913.
1,159,091.
Patented Nov. 2, 1915.
3 SHEETS—SHEET 1.
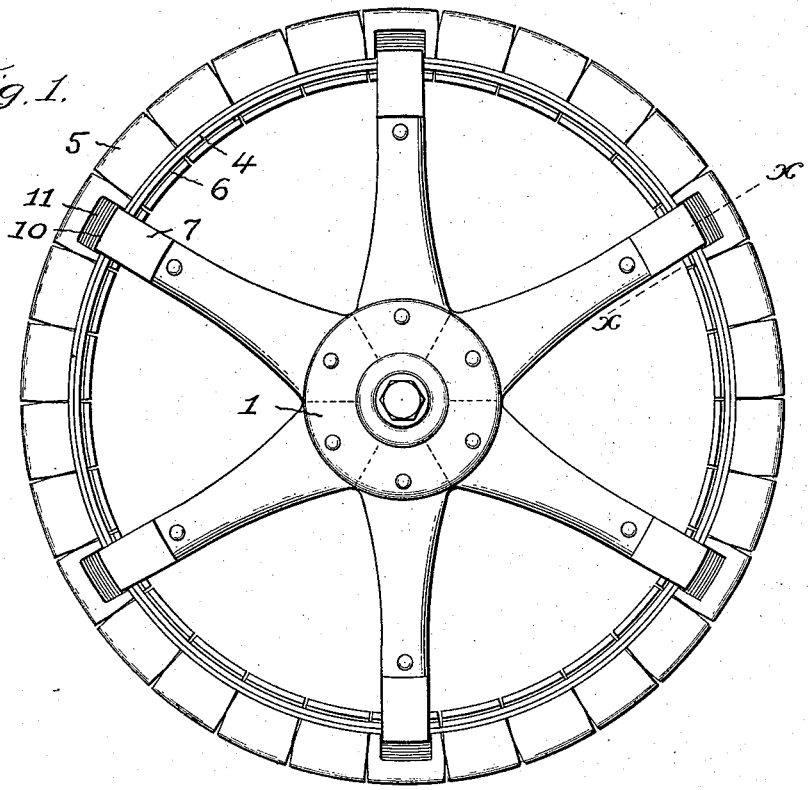
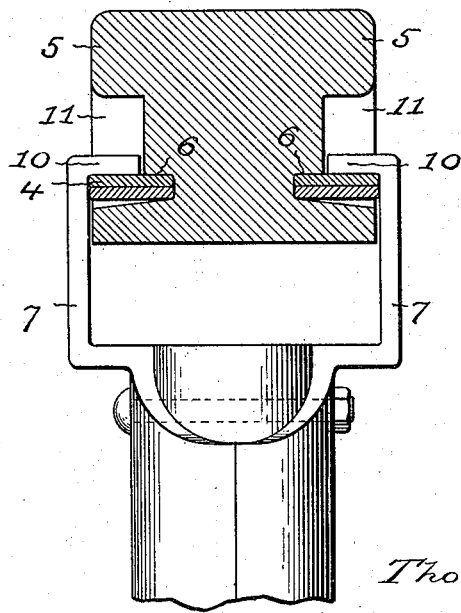

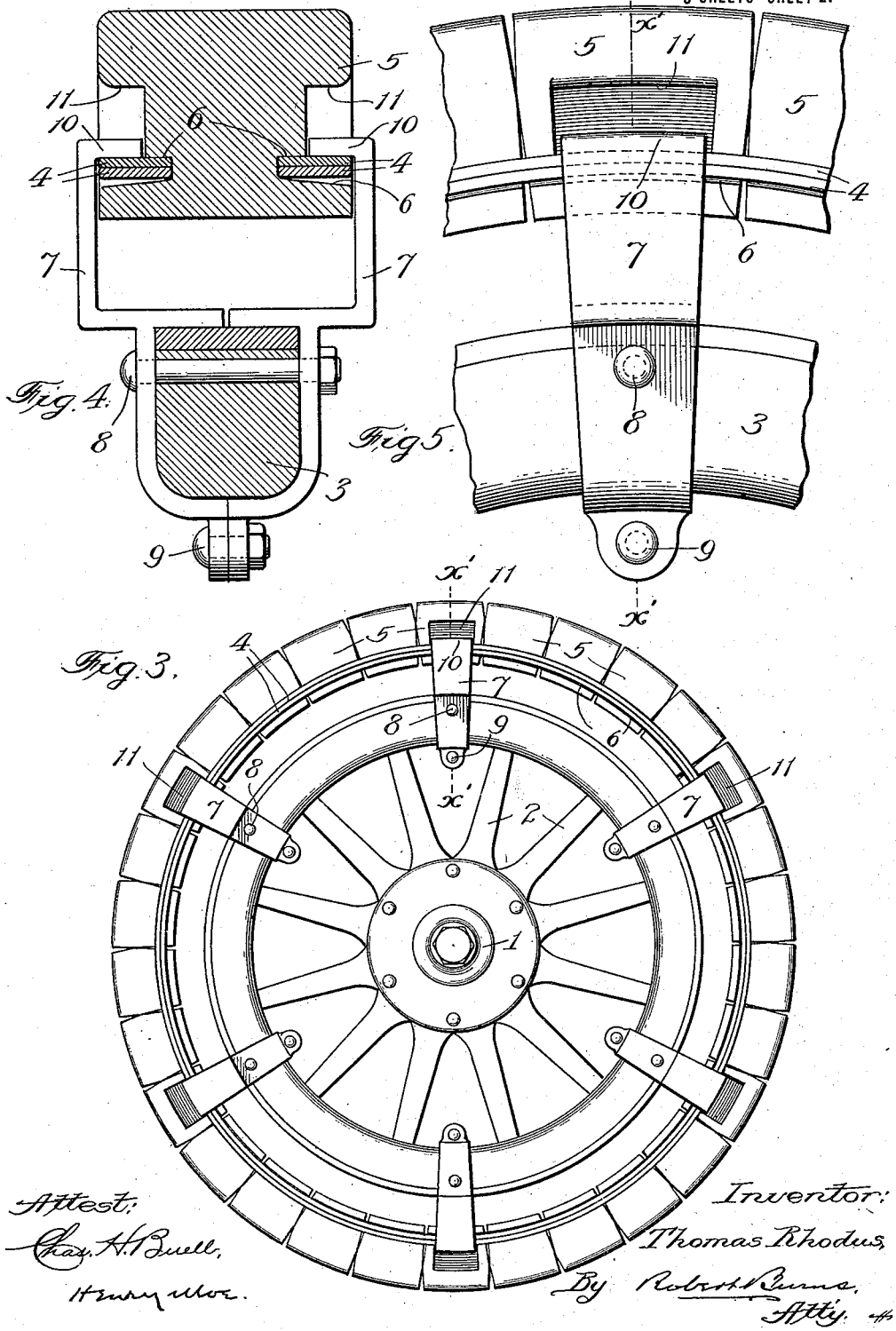

T. RHODUS.
VEHICLE WHEEL.
APPLICATION FILED FEB. 15, 1913.
1,159,091.
Patented Nov. 2, 1915.
3 SHEETS—SHEET 3.
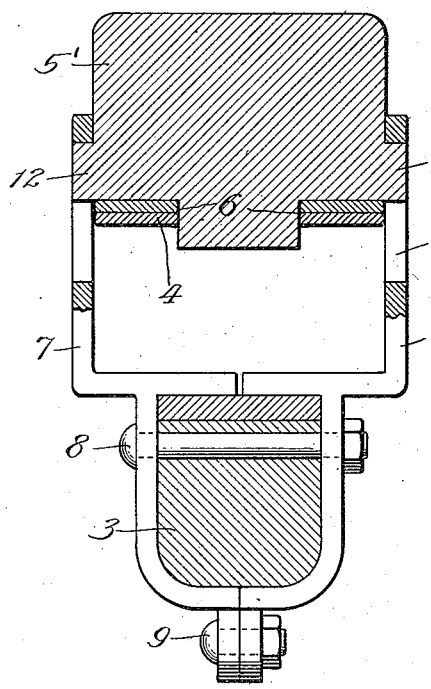
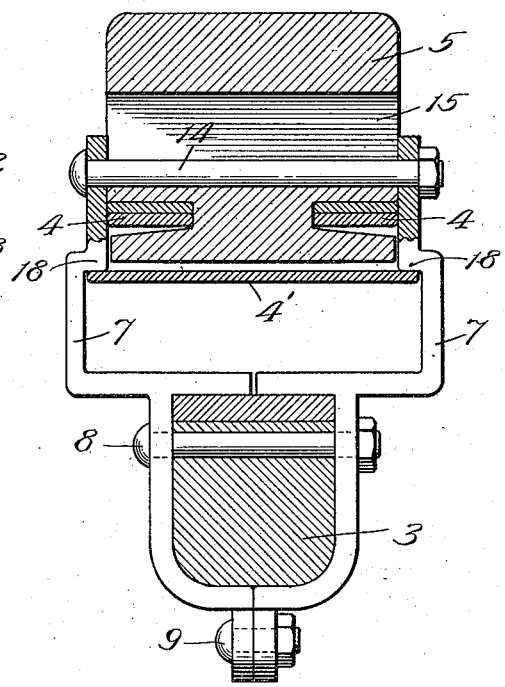
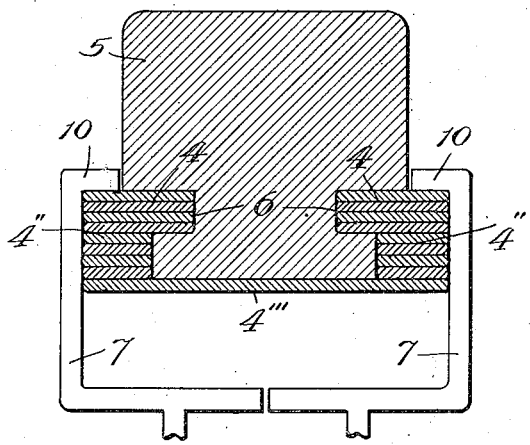
Attest:
Chas. H. Buell.
Henry Moe.
Inventor:
Thomas Rhodus,
By Robert Burns
Atty

UNITED STATES PATENT OFFICE.

THOMAS RHODUS, OF CHICAGO, ILLINOIS.

VEHICLE-WHEEL.

1,159,091.  Specification of Letters Patent.  Patented Nov. 2, 1915.

Application filed February 15, 1913. Serial No. 748,609.

*To all whom it may concern:*

Be it known that I, THOMAS RHODUS, a citizen of the United States of America, and a resident of Chicago, in the county of Cook, State of Illinois, have invented certain new and useful Improvements in Vehicle-Wheels, of which the following is a specification.

This invention relates to that type of elastic rim wheels in which the outer annular tread member of the wheel comprises a series of spring supported sector shaped pieces of suitable wear resisting material. And the present improvement has for its object to provide a simple and efficient structural formation and disposition of parts whereby the series of sector shaped tread pieces are yieldingly returned to a normal concentric relation to the axis of the wheel, after the tread member, comprising said tread pieces, has been flattened and distorted in actual use under the imposition of varying loads, and in a manner which readily absorbs shocks and cushions the load on the wheel. And which in addition does not retard the distortion of the tread member in actual use, so that there is obtained a maximum utilization of the resilient qualities of the spring member or members by which the series of tread pieces are yieldingly supported in true and normal concentric relation to the axis of the wheel, all as will hereinafter more fully appear.

In the accompanying drawings:—Figure 1, is an elevation of a vehicle wheel embodying one form of the present invention. Fig. 2, is a detail transverse section of the outer portion of the same on line x—x, Fig. 1. Fig. 3, is an elevation of a vehicle wheel illustrating another form of the present invention. Fig. 4, is an enlarged detail section on line x'—x', Figs. 3 and 5. Fig. 5, is an enlarged detail elevation of the parts shown in Fig. 4. Figs. 6, 7, and 8, are enlarged detail sections illustrating modifications of the detail construction and arrangement of parts of the present invention.

Similar reference numerals indicate like parts in the several views.

The present invention is equally applicable to a vehicle wheel of the ordinary construction and comprising the usual central hub 1, the series of radial spokes 2, and the rim or felly portion 3, as illustrated more particularly in Fig. 3. Or to a vehicle wheel of a special construction, in which the hereinafter described series of radial abutment bars or members take the place of the ordinary spokes 2 of the wheel, as illustrated in Fig. 1. In such construction the ordinary rim or felly 3 of the wheel is also dispensed with, and in consequence of said omissions greater lightness and economy in manufacture can be attained.

In the present improvement, 4 is a circular ring shape spring member preferably of the flat band type shown. Said spring member has a diameter greater than that of the wheel felly 3, aforesaid, and is normally held outside the same in concentric relation with said felly by abutting means hereinafter described in detail. In the main forms of the present improvement, duplicate and counterpart spring members 4, are preferably employed and disposed in adjacent relation to the opposite faces of the flexible tread member hereinafter described, and as shown in the drawings. And while it is within the scope of this part of the present improvement to form each endless spring member 4 from a flat strip of metal bent and welded into a circular and endless spring band, it is preferable however to form the spring member by a series of such endless bands arranged one within the other or by a combination of such bands, as shown in the different figures of the drawings; the number and arrangement depending on the degree of elasticity required, and the load that is to be carried.

5 are a series of blocks of any usual wear resisting material, and which preferably have a sector shape as shown, and are assembled end to end to form a sectional annular ring and constitute the outer flexible tread member of the present construction. The main portion of said outer flexible tread member is arranged to the outside of the circular spring member or members 4, above described, and adapted to have inward radial bearing engagement against said spring member or members 4, so that with a radial inward movement of a portion of said flexible tread member under an imposed load the circular spring member or members 4 will be also flexed inwardly at such point and cause a corresponding outward distortion or bulging of adjacent portions of said spring member or members.

As before mentioned, the duplicate and counterpart spring members 4, are arranged at the respective inner and outer faces of the flexible sectional tread member just described, and approximately flush with said faces as shown. In order that the spring members 4 may have direct and positive connection with said flexible tread member, for both simultaneous inward and outward radial movements, grooves 6 are formed in the side walls of the series of sector shaped blocks 5, into which the circular spring members 4 are fitted, and held in place by means hereinafter described.

7 are a series of radially disposed abutment forming bars or members, fixedly secured at their inner ends to the wheel center in any ordinary and suitable manner, and either by attachment to the peripheral flanges of the hub 1, as shown in Fig. 1, or to the wheel rim or felly 3, as illustrated in Fig. 3. In the latter case, the attachment is preferably attained by transverse clamping bolts 8 and 9, as shown. Said abutment bars or members 7 have their outer portions disposed in opposed relation, and adjacent to the respective outer and inner faces of the flexible tread member and spring members before described, and for the various purposes of providing a series of holding abutments for the circular spring members 4, to maintain said spring members as well as the sections 5 comprising the flexible tread member in normal concentric relation to the axis of the vehicle wheel to prevent any circular creeping of the flexible tread member upon the wheel center, and to prevent lateral displacement of the flexible tread member and the spring members with relation to the wheel center. In order to attain practical results there should be not less than three radially extending abutment bars or members 7, nor so many as to interfere with the necessary bulging of the spring members 4, when under load. In the preferred forms shown in Figs. 1 and 3, a series of six of said abutment bars or members are shown, as best adapted for general use.

At their outer ends the aforesaid abutment bars or members 7 have engagement with the immediately adjacent tread forming blocks 5, in a manner which permits of limited independent radial movement between the parts. In the preferred form of engagement shown in Figs. 1, 2, 3, 4 and 5, inturned lugs or flanges 10, on the outer ends of the bars 7, are adapted to have the above mentioned limited movement in recesses 11, formed in the walls or faces of the adjoining tread forming blocks 5, as shown.

In the modified construction shown in Figs. 6 and 9, lateral lugs 12, extending outwardly from the walls of adjacent blocks 5' have the described limited movement in radially extending slots 13 formed in the outer portions of the radial abutment bars or members 7, aforesaid.

The modified construction shown in Fig. 6, is adapted for use in connection with an endless flexible tread of rubber or like material, the receiving grooves 6, for the spring members 4, being of the undercut form shown, and having only two walls instead of the three walls in the preferred construction heretofore described.

In the modified form shown in Fig. 7, transverse bolts 14 extend between the outer ends of opposed pairs of the abutment bars or members 7, and said bolts have the described limited movement in radially disposed slots 15, in the adjacent outer tread forming blocks 5.

In the type of spring member illustrated in Fig. 7, the same formation and arrangement as that described in connection with Figs. 1, 2, 3, 4 and 5 prevails, with the addition of a reserve resilient means, which only comes into effective action after a predetermined distortion of the main spring takes place, and to such end comprises, an endless spring band 4' of less diameter than the inner diameter of the outer flexible tread member of the present construction, said endless spring band 4 being supported in a normal concentric and inactive position by abutment offsets 18 formed in the series of radial abutment bars or members 7, aforesaid.

The type of spring members 4, illustrated in Fig. 8, is more especially adapted for heavy loads, and comprises, in addition to the series of endless spring bands which have engagement in the before described annular side groooves 6 of the tread forming blocks 5, two auxiliary and intermediate but narrower spring bands 4'', and a single inner spring band 4''' of some width and common to both series of auxiliary series of bands 4'' aforesaid.

As in the construction set forth in my former Patent No. 1,025,483, dated May 7, 1912, when the wheel is not under load, the annular spring member or members 4 are in engagement with the abutment bars 7, either directly or indirectly through the series of outer tread forming blocks 5, and are concentric with the wheel axis. As the wheel rolls over the road under load, the lower portion of the outer flexible tread member and the hub of the wheel approach each other, and the adjacent portions of the spring member or members 4 are correspondingly flattened with a consequent outward distortion of the other portions of said spring members not in engagement with the abutment bars. And the resistance of said spring members to such flattening and distortion is adapted to absorb the shocks due to irregularities in the roadway and provide an easy riding structure.

Having thus fully described my said invention what I claim as new and desire to secure by Letters Patent, is:—

1. In a wheel, the combination of a wheel center, a plurality of ring shape metal spring members disposed in lateral spaced relation and encircling the wheel center, an outer flexible tread member formed with annular grooves for the reception of the spring members, and means at circumferential intervals for holding the associated tread and spring members in operative relation to the wheel center, substantially as set forth.

2. In a wheel, the combination of a wheel center, a plurality of ring shape metal spring members disposed in lateral spaced relation and encircling the wheel center, means at circumferential intervals for holding the spring members in operative relation to the wheel center, an outer flexible tread member comprising a series of blocks, and means for holding said spring members in laterally spaced relation to each other and in working relation to the series of blocks aforesaid, substantially as set forth.

3. In a wheel, the combination of a wheel center, a plurality of ring shape metal spring members disposed in lateral spaced relation and encircling the wheel center, an outer flexible tread member comprising a series of blocks formed with annular grooves for the reception of the spring members, and means at circumferential intervals for holding the associated tread and spring members in operative relation to the wheel center, substantially as set forth.

4. In a wheel, the combination of a wheel center, a plurality of ring shape metal spring members of a flat form in cross-section disposed in lateral spaced relation and encircling the wheel center, an outer flexible tread member formed with annular grooves for the reception of the spring members, and means at circumferential intervals for holding the associated tread and spring members in operative relation to the wheel center, substantially as set forth.

5. In a wheel, the combination of a wheel center, a plurality of ring shape metal spring members of a flat form in cross-section disposed in lateral spaced relation and encircling the wheel center, an outer flexible tread member comprising a series of blocks formed with annular grooves for the reception of the spring members, and means at circumferential intervals for holding the associated tread and spring members in operative relation to the wheel center, substantially as set forth.

6. In a wheel, the combination of a wheel center, a plurality of spring members encircling the wheel center, an outer flexible tread member associated with the spring members and comprising a series of blocks formed with annular grooves in their side walls for the reception of the spring members, and means for holding the associated tread and spring members in operative relation to the wheel center, the same comprising a series of radial extensions on the wheel center connected to the associated tread and spring members by means which admit of limited independent movement between said members and the wheel center, substantially as set forth.

Signed at Chicago, Illinois, this 13th day of February, 1913.

THOMAS RHODUS.

Witnesses:
ROBERT BURNS,
HENRY MOE.

Copies of this patent may be obtained for five cents each, by addressing the "Commissioner of Patents, Washington, D. C."